P. A. DRUCKLIEB.
CIGARETTE FINISHING MACHINE.
APPLICATION FILED MAY 16, 1913.
1,253,580.
Patented Jan. 15, 1918.
10 SHEETS—SHEET 9.
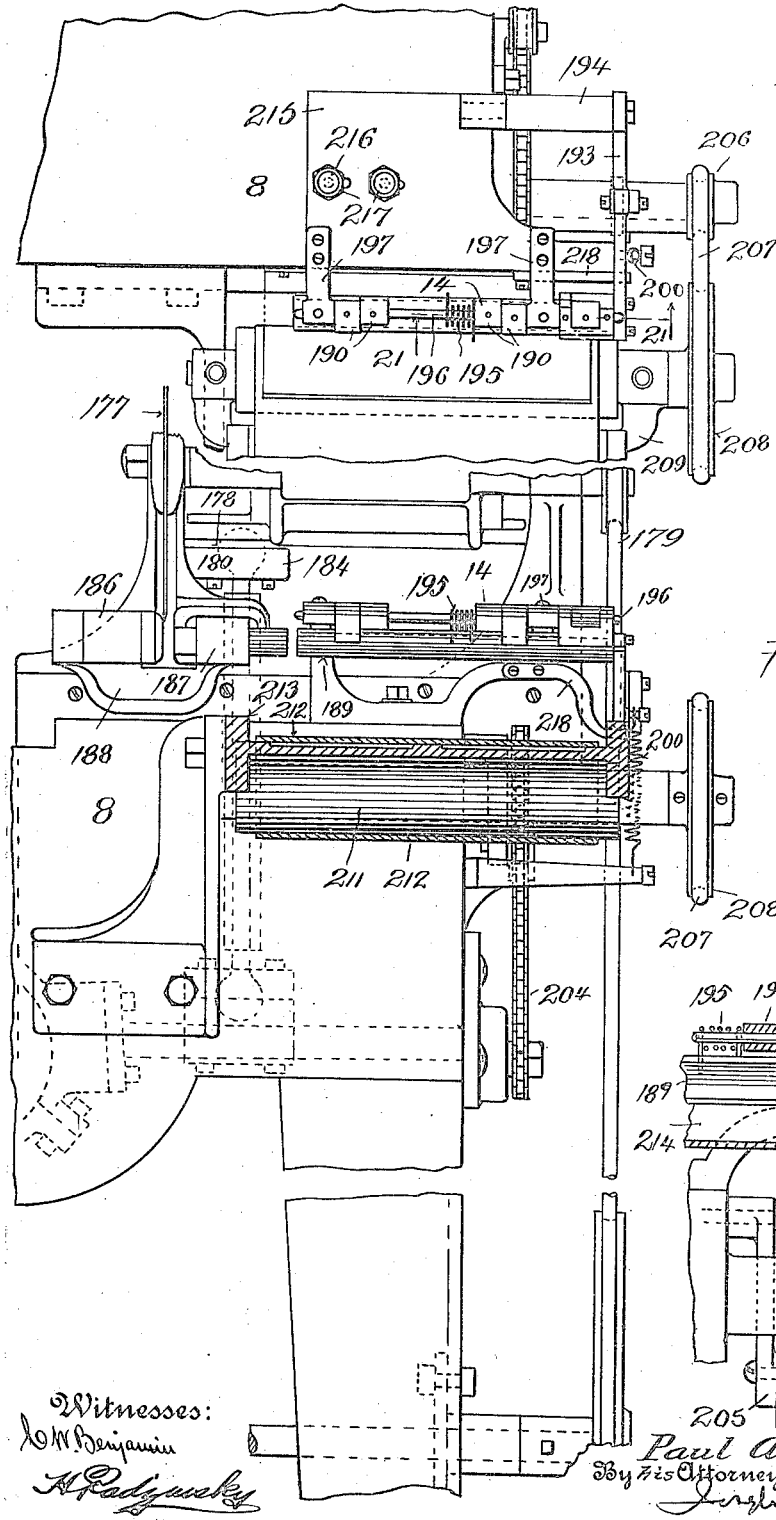
Witnesses:
O. W. Benjamin
H. Radzunsky
Inventor
Paul A. Drucklieb
By his Attorney

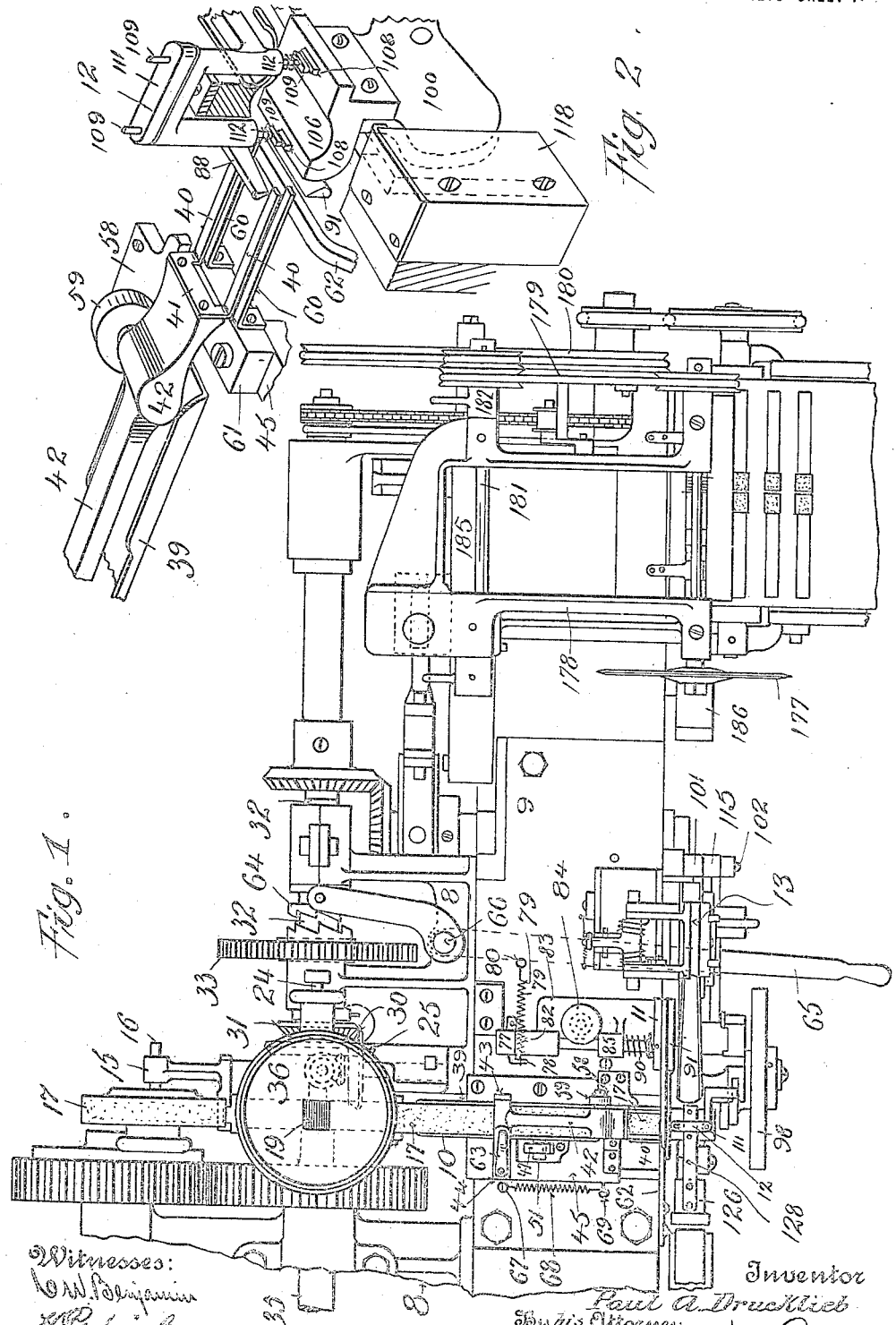

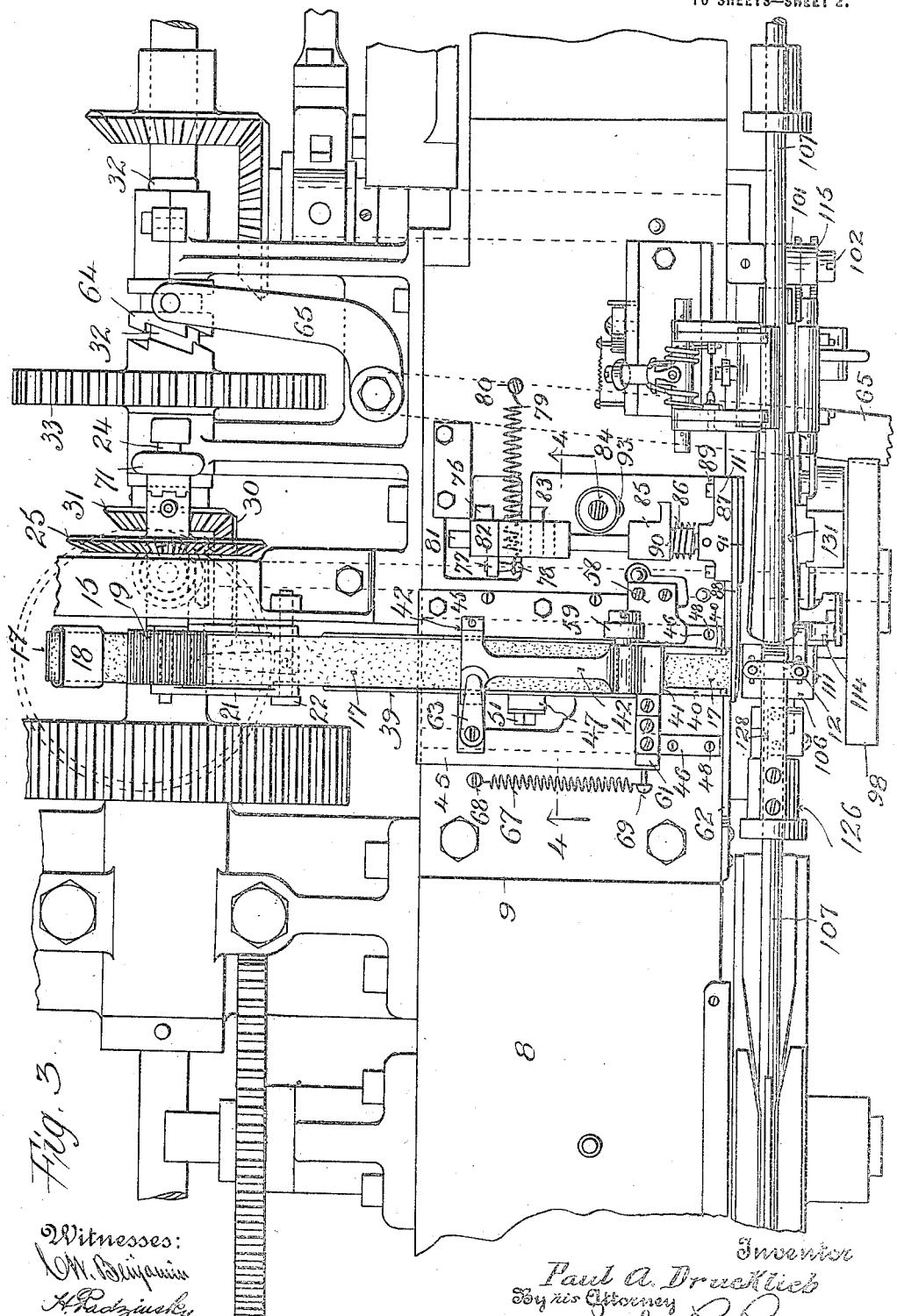

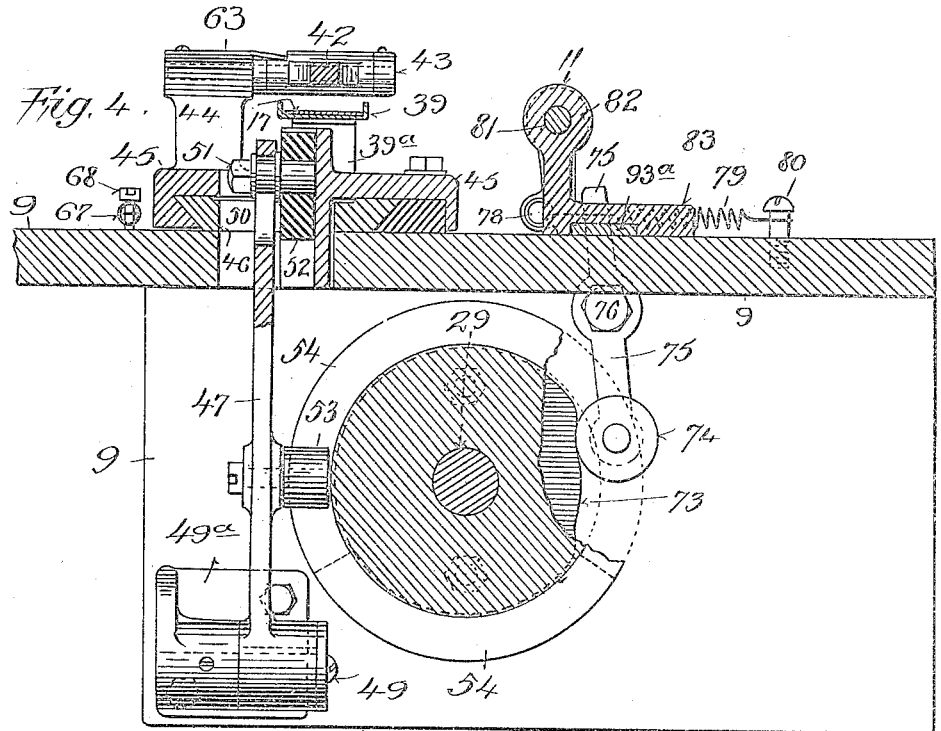

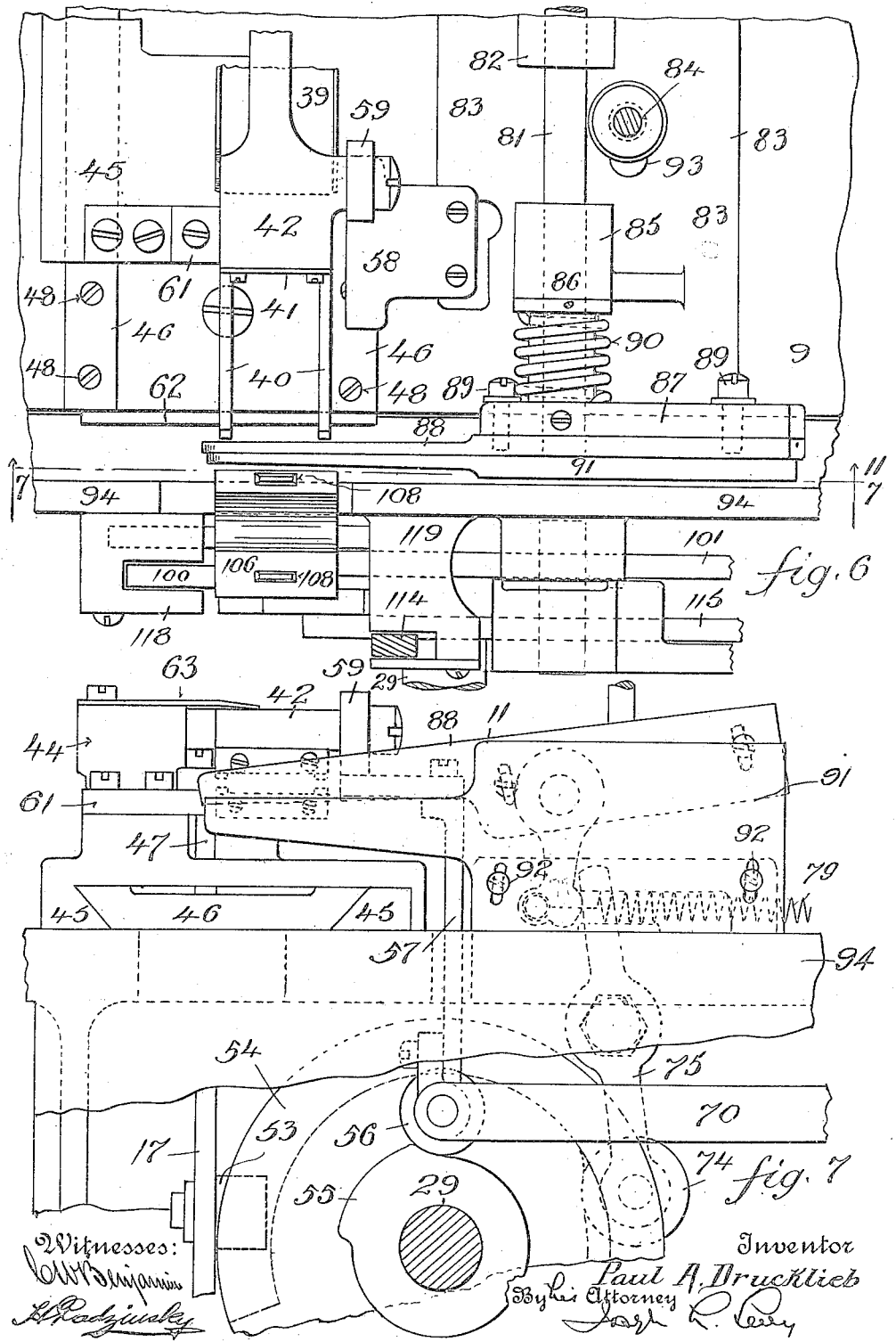

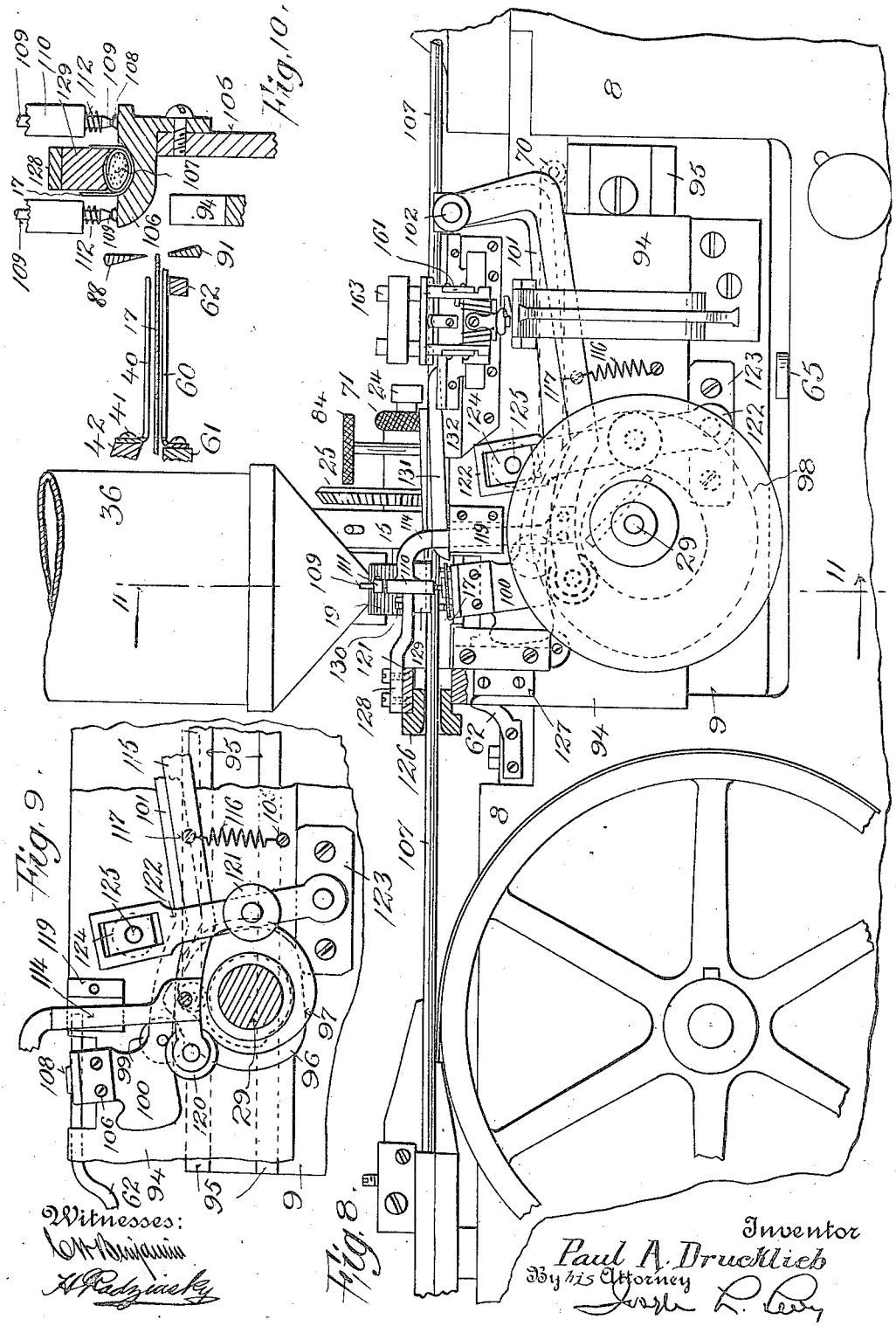

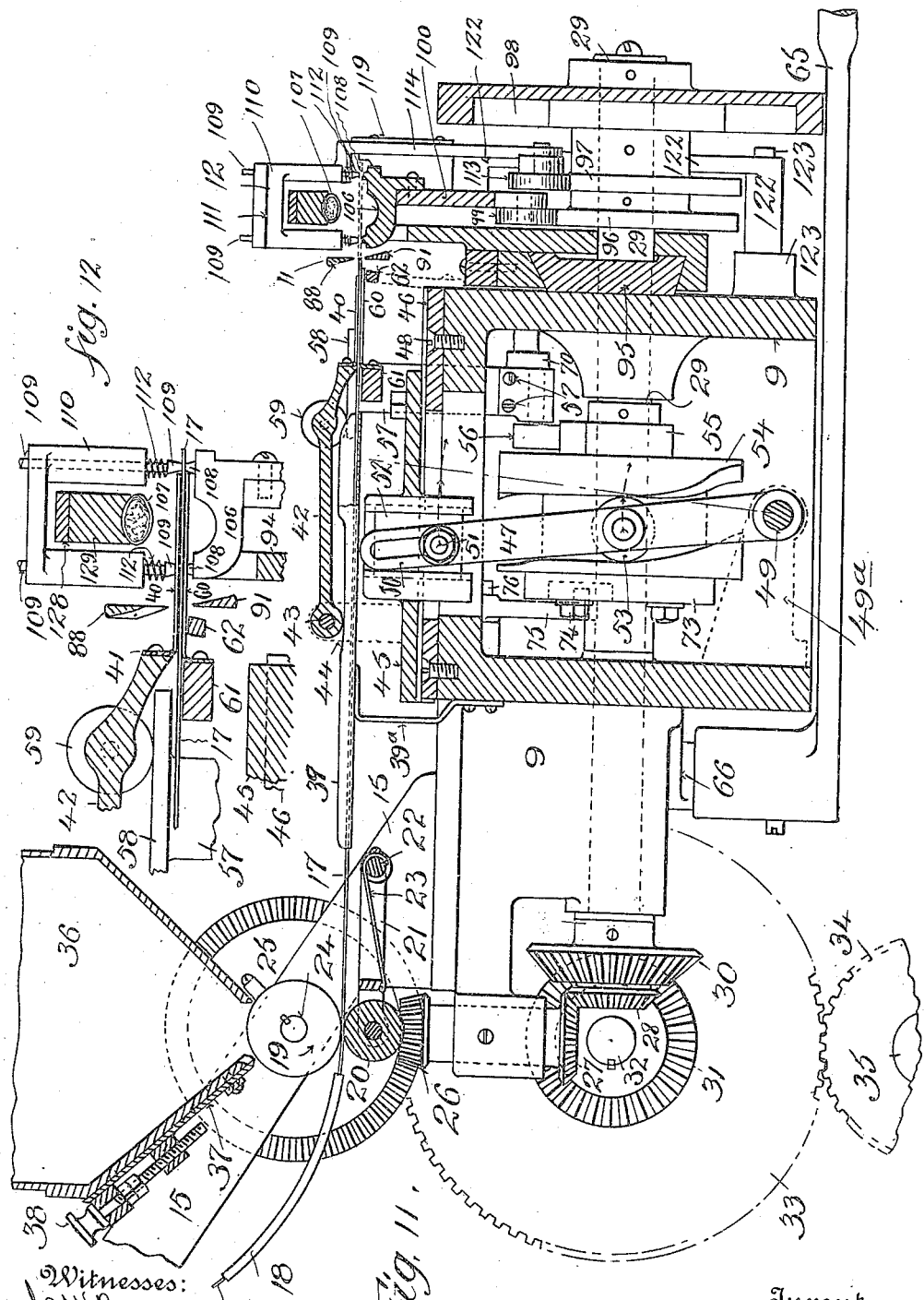

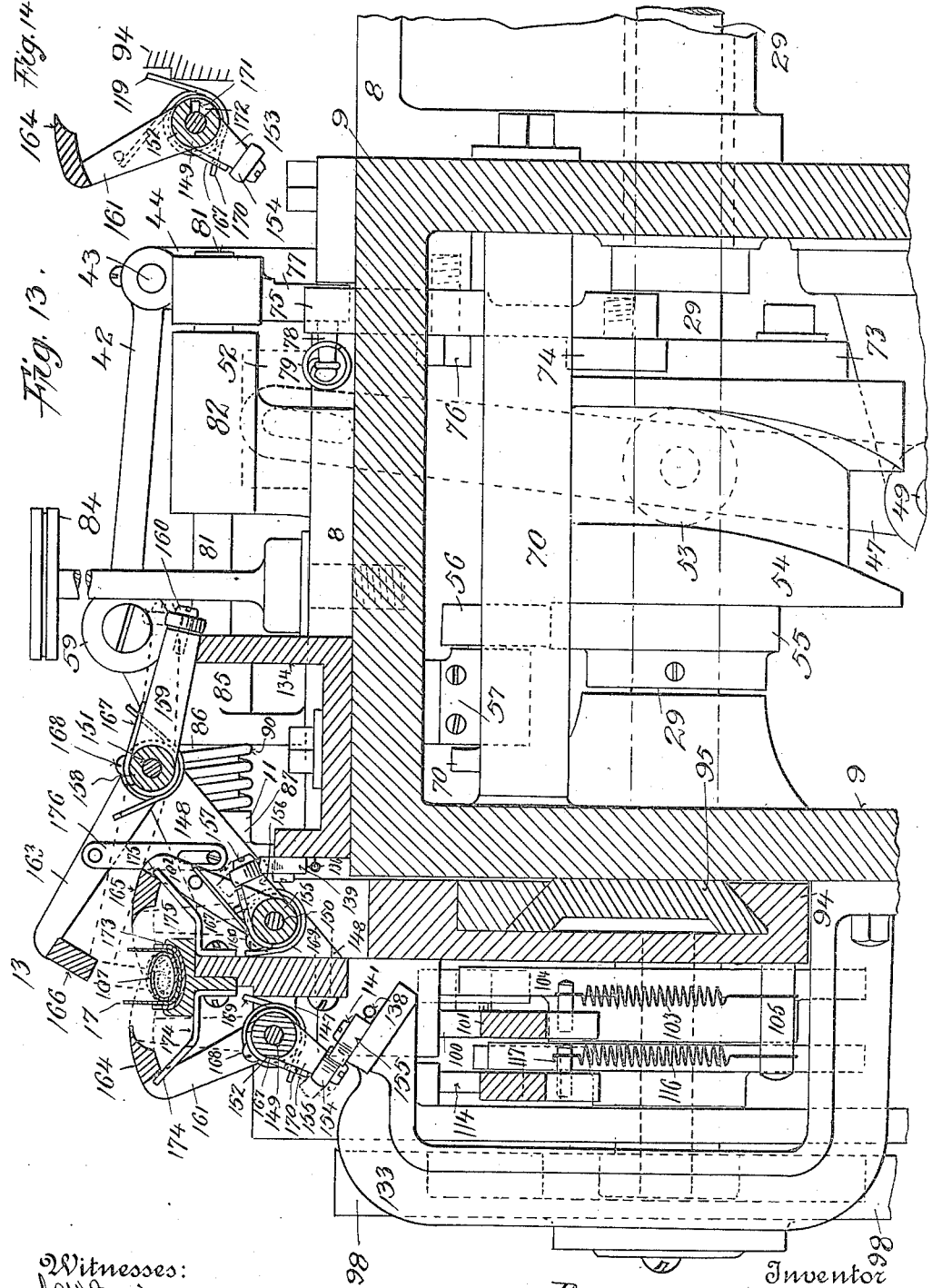

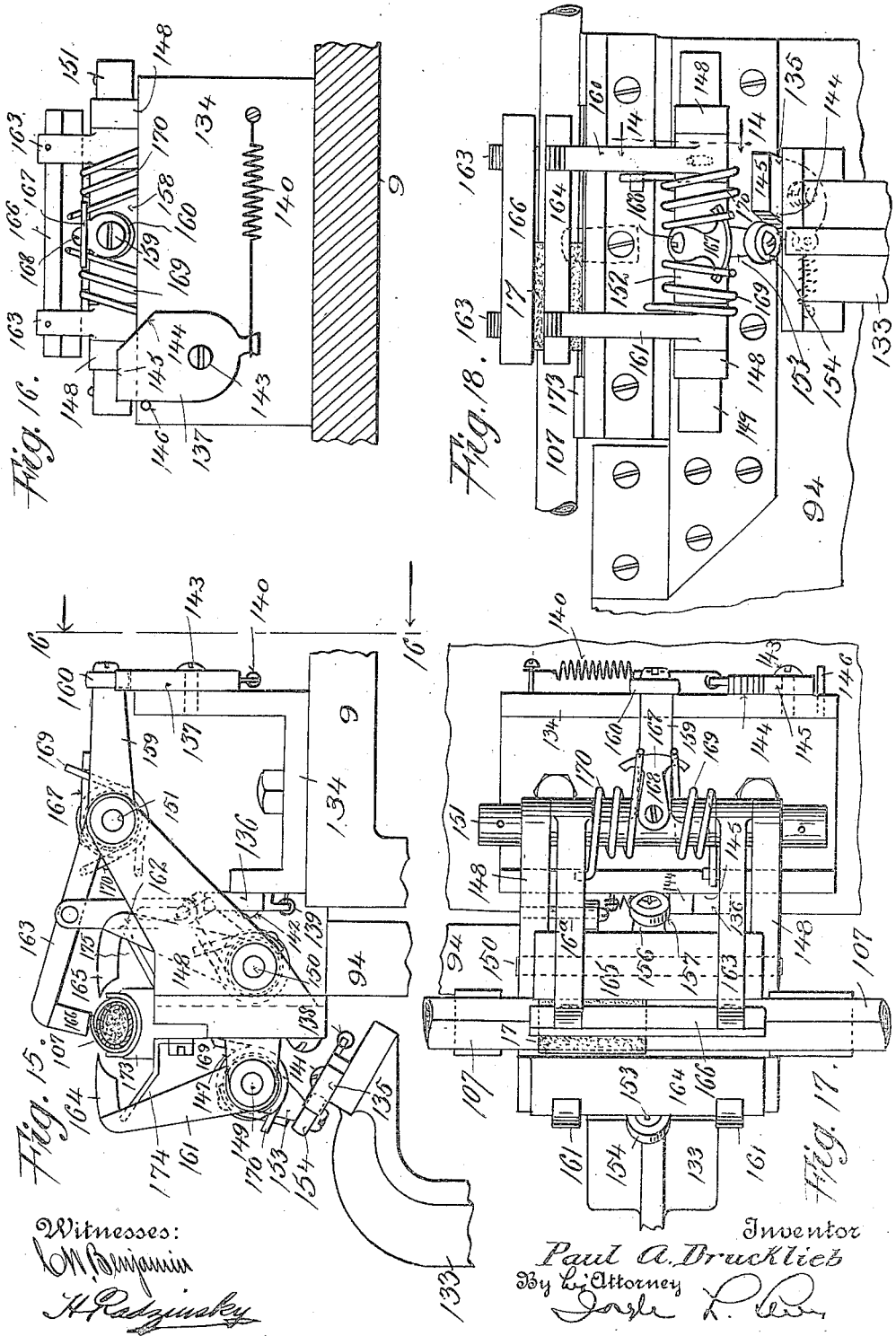

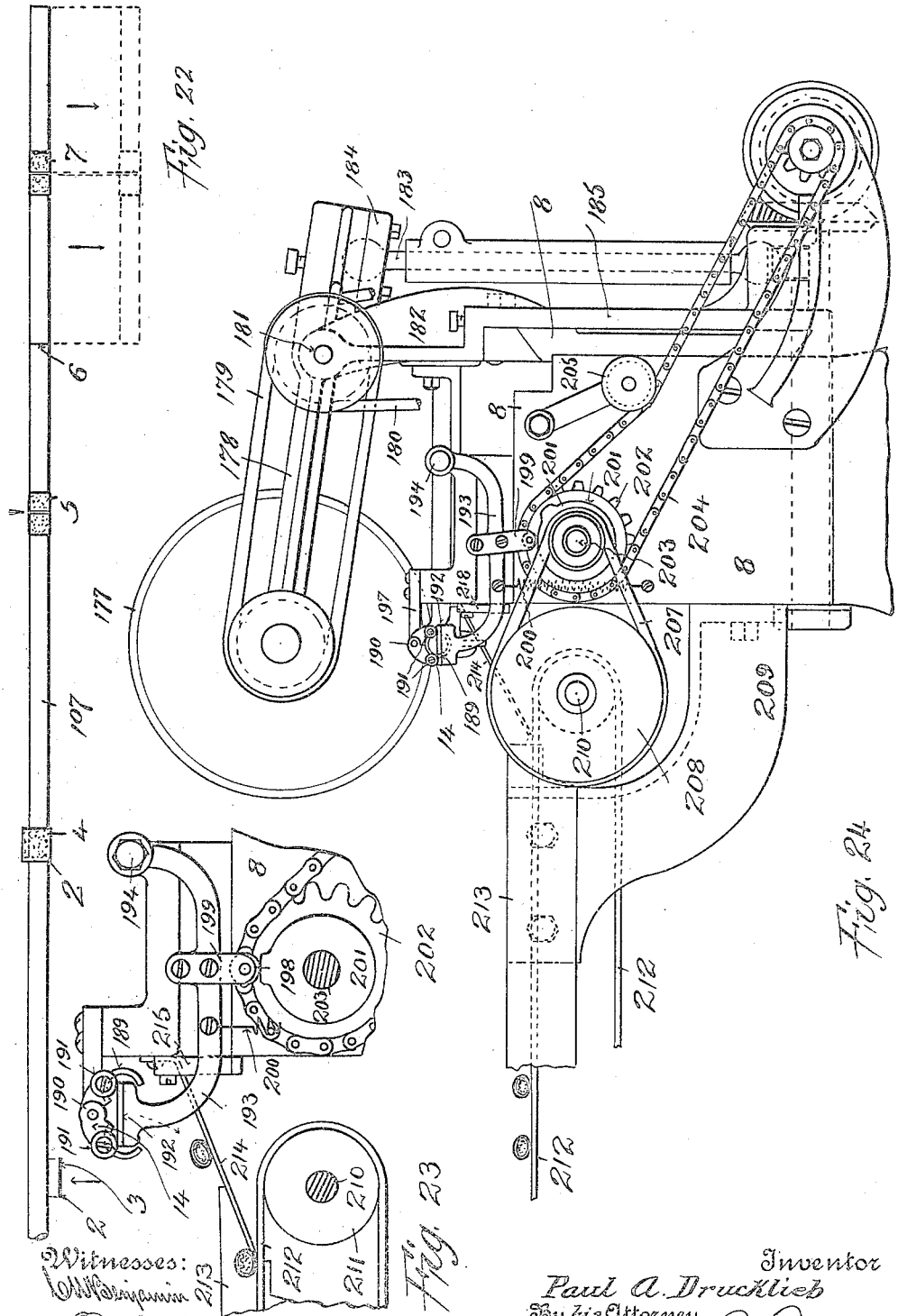

UNITED STATES PATENT OFFICE.

PAUL A. DRUCKLIEB, OF NEW YORK, N. Y., ASSIGNOR TO NEW YORK CIGARETTE MACHINE COMPANY, OF NEW YORK, N. Y., A CORPORATION OF NEW YORK.

CIGARETTE-FINISHING MACHINE.

1,253,580.      Specification of Letters Patent.      Patented Jan. 15, 1918.

Application filed May 16, 1913. Serial No. 767,998.

*To all whom it may concern:*

Be it known that I, PAUL A. DRUCKLIEB, a citizen of the United States, and a resident of the city of New York, borough of Richmond, and county of Richmond, State of New York, have invented a new and useful Improvement in Cigarette-Finishing Machines, of which the following is a specification.

The object of my invention is to provide a machine which will apply tips to a moving cigarette rod, and provide for the severing of the cigarettes and separating of the component parts so that all cigarettes will be assembled with uniformity upon leaving the machine. This object is accomplished by my invention by which a tip is applied at regular intervals and the tube is then severed in the tip and also midway between the same, and finally the severed cigarettes are assembled in two groups so that all cigarettes in one group will have the tip standing at the same end, so that the cigarettes will be ready for packing. The tip may be of any desired material such as paper, metal, silk, cork, etc. But for convenience I shall call it cork in the specification.

For a more particular description of my invention, reference is to be had to the accompanying drawings, forming a part hereof, in which—

Figure 1 is a plan view of my improvements, applied to a cigarette machine of the continuous rod type.

Fig. 2 is a perspective view of a portion of the cork strip feeding and applying mechanism.

Fig. 3 is a plan view, of the cork applying mechanism, somewhat more enlarged than what is shown in Fig. 1;

Fig. 4 is a sectional view, taken on the line 4—4 of Fig. 3, looking in the direction of the arrows.

Fig. 5 is a side elevation of the structure shown in Fig. 6.

Fig. 6 is a plan view of the shearing mechanism and parts adjacent thereto.

Fig. 7 is a sectional view taken on the line 7—7 of Fig. 6 looking in the direction of the arrows.

Fig. 8 is a front elevation of the structure shown in Fig. 3.

Fig. 9 shows a part of this structure with the main cam removed.

Fig. 10 is a sectional view showing details of the severing mechanism and cork applying mechanism.

Fig. 11 is a sectional view taken at right angles to the view in Fig. 8, substantially on the line 11—11 of Fig. 8, looking in the direction of the arrows.

Fig. 12 is a view of the structure shown in Fig. 10 in a different position.

Fig. 13 is a cross-section of the mechanism for wrapping the cork strip about a cigarette rod.

Fig. 14 is a sectional view showing the details of the same, the view being taken on the line 14—14 of Fig. 18, looking in the direction of the arrows.

Fig. 15 to 18 inclusive relate to the mechanism for wrapping the ends of the tip about the cigarette rod and finishing the same, Fig. 16 being a sectional view taken on the line 16—16 of Fig. 15.

Fig. 19 is a plan view of a portion of the structure for separating cigarettes so that each cigarette will stand properly in the assembling receptacle.

Fig. 20 is a front elevation of the structure shown in Fig. 19.

Fig. 21 is a sectional view, taken on the line 21—21 of Fig. 19, looking in the direction of the arrows.

Fig. 22 is an illustrative view to show the position of a cork strip on the cigarette rod at various positions throughout the travel in the machine.

Fig. 23 is an end elevation of the separating mechanism with the jaws open.

Fig. 24 is a view in greater detail of the separating mechanism, and is also an end elevation of the machine with the jaws closed.

Throughout the various views of the drawings, similar reference characters designate similar parts.

The operation of the machine will be readily understood after considering the functions of various subcombinations, which subcombinations coöperate together to perform the functions of the machine. The cigarette rod is formed in any convenient way and does not affect the tipping device which can be attached to any suitable cigarette machine. Referring to Fig. 22, here 107 indicates a cigarette rod of the usual type, which is preferably, but not necessarily, elliptical in cross-section. 2 indicates a strip of cork with fresh paste thereon, adapted to be applied to the rod 107 at periodical intervals. At 3 the strip rests under the rod and is ready to be raised in contact therewith, and at the same time have its ends free. At 4 the strip 2 is shown in contact with the rod, the ends being free. At 5 the rod has been severed through the middle of the cork after the ends have been pressed down. At 6 is shown a severing of the rod midway between the strips. At 7 the cigarettes are shown at the limit of the longitudinal run of the rod, the two cigarettes with the cork ends abutting being ready to be dropped on the belt below and shifted in the direction indicated by the arrows. My improvement consists of several parts which may be designated in a general way as follows: the ribbon supplying mechanism 10, which supplies the ribbon in a suitable condition for use, except that it is not severed; the severing mechanism 11, the band applying mechanism 12; the end securing mechanism 13, and the severing and separating mechanism 14. Each of these will now be described under a separate heading.

*Ribbon and paste supplying mechanism.*

The main frame 8 of the machine has a recess in which is carried a secondary frame 9 of the cork applying mechanism from which extends a bracket 15, on which is a mounting 16 for the cork strip 17 which is preferably in the form of a reel. This cork 17 extends downwardly through a guide 18 and thence to the pasting rollers 19 and 20. The roller 20 carries no paste and is mounted in a bracket 21 which is pivoted at 22 on a bar, or any other proper supporting means, and on this bar and against said bracket is a spring 23 which normally keeps the roller 20 adjacent to the roller 19, or against the under side of the cork 17, when such cork is in the machine. The roller 19 is suitably mounted on a shaft 24 journaled in the bracket 15. It may be driven through a clutch described below. This shaft is connected to a beveled gear 25 which meshes with a corresponding beveled gear 26 on a vertical shaft that is fixed to another beveled gear 27 that meshes with a similar beveled gear 28 on the main shaft 29 of the cork supplying part 10. The diameter of the wheel 19 and the pitch of the gear 25 are so proportioned that for a given time, the peripheral velocity of the wheel 19 is less than the feed of the strip 17 so that slack will not accumulate in the machine. This shaft 29 also carries a second beveled gear 30 which is fixed thereto, which meshes with a third beveled gear 31, on a shaft 32, which carries a gear 33 that meshes with a pinion 34, on the main shaft 35 of the machine. This main shaft is driven in any suitable manner and drives all the mechanism of the machine herein described.

Above the paste roller 19 is a reservoir 36 which may be of the conventional form, and is suitably mounted on the bracket 15 by any suitable support. This reservoir 36 has, near the opening, a slide 37 controlled by a screw 38 in the conventional manner, so that the amount of paste flowing on the wheel 19 may be regulated with great accuracy.

After receiving paste from the wheel 19 the ribbon of cork 17 passes through another guide 39 supported by a bracket 39$^a$ from the frame 9. This guide 39 extends far enough forward to carry the ribbon 17 and properly support it, but not far enough forward to interfere with the action of the grippers which will now be described.

The upper gripper 40 is preferably shaped as shown in Fig. 2, that is it has two parallel bars extending forward which are integrally united to a base or head 41, which is secured to an arm 42 which is pivoted at 43 to an upright 44 on a slide 45. This slide 45 has a reciprocating movement parallel to the axis of the shaft 29, and at right angles to the direction of travel of the cigarette rod, and this movement is controlled by the guide 46, and the lever 47. The guide 46 is held in position by means of screws 48 which secure it to the bed 9 and the lower end of the lever 47 is pivoted on a pivot 49 on a bracket 49$^a$ which is also supported from this part 9. The upper end of the lever 47 is slotted at 50 so as to receive a bolt or screw 51 secured to the slide 52 in guides in the slide 45. The slide 52 moves at right angles to the direction of movement of the slide 45. The slot 50 in the upper end of the lever 47 permits of any adjustment that may be necessary to govern the amount of feed of the cork strip which amount will vary according to the cross section of the cigarette rod. The lever 47 is provided with a cam roller 53 which engages a corresponding cam 54 fixedly mounted on the shaft 29 and positively moves the slide 45 forward and backward. At the front end of the cam 54 is a second cam 55 which engages a roller 56 which supports an upright 57 which rides vertically in the frame 9, but has no other movement. It swings on a link 70 described below. The upper end of this bar 57 is horizontally disposed and somewhat extended as shown at 58 to support a roller 59 carried by the bar or arm 42, for a purpose which will be described hereafter. The lower jaws 60 of the grippers 40 are preferably made as shown in Fig. 2, that is these lower jaws are secured to a cross-bar 61 carried by the cross-head or slide 45 in any suitable manner so as to partake of all the movements of this cross-head and of no other movements. The extreme ends of these grippers 60 may rest on a guard 62 when the slide 45 is at the forward limit of its movement so that the cork strip is held true while being severed.

The rear end of the arm 42 is provided with a leaf spring 63 which normally holds this arm down at its front end. This spring is secured to the upright 44 which supports this arm 42, or to any other part of the slide 45, as may be desired.

The wheel 33 on the shaft 32 runs idle on this shaft, when no tips are to be applied to the rod, but may be fixed thereto by means of a clutch 64 operated by a handle 65, pivoted at 66 to the frame of the machine whenever it is desired to run the cork band applying mechanism so as to place these cork bands on the cigarette rod 107 passing through the cigarette machine.

A coiled spring 67 is secured at one end to the bed 9 by a screw 68 and at the other end to the slide 45 by means of a screw 69 so as to prevent any knocking in the rapid action of the roller 53 in its cam 54.

The upright 57 is preferably guided by a lever 70 pivotally connected to a suitable part of the frame 9, as shown in Fig. 13.

If desired, the paste wheel 19 may be thrown into or out of connection with the shaft 24 by a clutch 71 placed so as to permit this wheel to be either fixed or loose on this shaft.

The operation of the ribbon feeding device will now be set forth with the understanding that the clutch 64 is thrown so as to operate the gear 33, the clutch 71 is thrown to operate the paste wheel 19 in fixed relation to the shaft 24 and that the reservoir 36 has the proper and required amount of paste. It is also assumed that the ribbon 17 is put in proper position, passing between the rollers 20 and 19 and on to the guide 39, and is extended far enough to be properly gripped between the grippers 40 and 60. Under these conditions the strip is fed continuously through the pasting roller on to the guide 39 to the grippers 40, which slide back and forth under the influence of a cam 54 and the roller 53 which drives the lever 47 pivoted at 49. On the forward drive the grippers carry the strip 17 along with them but on the return movement the cam 55 acts through the roller 56 and upright 57 so as to raise the head 58 and thereby raise the roller 59 causing the jaw 42 to rise and thereby releasing the grippers from the pasted strip 17 which is held by mechanism described below while the grippers 60 and 40 retreat to their rearward and normal position. Here they remain until the severing mechanism has severed a strip, whereupon the cam 55 allows the gripper 40 to rest on the cork, and then they retreat a trifle farther so as to clear the cork from the severing blades. Here they remain until the mechanism is ready for them to again repeat the cycle which is done indefinitely when the machine is in operation. The feed slide 45 has a greater travel than a length of required tip so as to keep the cork strip taut and to prevent accumulation of cork.

*The shearing mechanism for cutting the strips of cork.*

The shearing mechanism 11 is driven from a suitable cam 73 which is on the shaft 29 immediately in the rear of the cam 54, and is secured to this cam 54 by means of two screws in slotted holes to allow for adjustment. The cam 73 engages a roller 74 mounted in the usual manner at the end of a lever 75, which is pivotally connected to the frame 9 by means of a pivot 76. The other end of the lever 75 runs against an arm 77 with a pin 78 which engages a coiled spring 79 which is also secured at its other end to a screw 80 rising from the bed 9. The upper end of the arm 77 is fixed to a shaft 81 journaled in a bearing 82, the lower end of which bearing forms a plate 83 which may be slightly shifted on the bed 9 and fixed in position by means of a clamping screw 84, or by any other suitable means. The shaft 81 also passes through a second bearing 85 which is integral with the plate 83, and is supported therefrom the same as the bearing 82, so that the shaft 81 is properly journaled at all times. The function of the spring 79 is to keep the arm 77 in engagement with the lever 75 at all times and to keep the roller 74 against the cam 73. The bearing 85 also has mounted thereon a collar 86 which has one end against the bearing 85 and its other end against a spring 90 and the end of the spring 90 presses against the plate 87. This collar can be moved to regulate the tension of the spring 90. The plate 87 is fixed to a blade 88 of the shearing mechanism by means of cap screws 89. The spring 90 keeps the cutting edges of the shears in suitable contact. The lower or fixed blade 91 of the shearing mechanism 11 is secured to the plate 83 by means of screws 92 passing through suitable slots or other means. This fixed blade is preferably made as shown so as to be adjustable for wear.

The result of this is that the rocking of the arm 77 by the lever 75 will cause the upper jaw 88 of the shearing mechanism 11 to rise and fall, and thereby shear the cork strip or ribbon at the proper place and time, as will more particularly appear below, the cam 73 being shaped so as to produce this result in coöperation with the other mechanism, above described. The cap screw 84 passes through a slot 93 in the plate 83 and so permits a slight movement in one direction or another, that is to or from the front of the machine. A slot in the bottom of this slide, the walls of which are engaged by a guide plate 93ª, insures this result so that the jaws always move so as to cut true in whatever position they may be placed, whereby the correct action of the cutting mechanism 11 is assured. This structure makes ample provision for taking up the wear incidental to the use and grinding of the shears. It is also to be noted that the arrangement is such that the action of the spring 79 causes the cutting and the cam the opening of the shears, thus preventing breakage in case anything too strong for the shears to cut should get between the blades.

*Band applying mechanism.*

The shaft 29, through a series of cams, to be described below, drives the band affixing mechanism 12. This mechanism slides on a vertically disposed plate 94 which has a suitable dove-tailed recess which engages a corresponding projection 95 on the front face of the frame 9. These three cams numbering from rear to front, are 96, 97 and 98, the two former being cams with peripheries which engage suitable rollers, and the latter a cam with a groove. The cam 96 is engaged by a roller 99 which is connected to an upright 100, which swings on an arm 101 pivoted at 102, to the plate 94. A coiled spring 103 secured at one end to a pin 104 extending from the arm 101 and the other end to a pin 105 fixed to the slide 94 keeps the roller 99 upon the cam 96 under the normal conditions of service. The upper end of the upright 100 is provided with a detachable head 106 which is recessed according to the shape of the cigarette rod 107 which passes therethrough in a manner which will be described below. This head 106 also has projections 108 extending from its upper surface which are adapted to press against the cork as will appear below. As this head 106 is detachable, different forms of heads may be used for various forms of rod 107, each of these heads being shaped to the peculiar cross section of the rod in the machine.

The head 106 is adapted to engage against the cork as stated above, and the other side of the cork opposite the head is engaged by the spring pressed fingers 109. These fingers slide freely through a suitable guide 110 and at their upper end they are connected by a cross-bar 111, or in any other manner, as desired, to insure even pressure of both fingers. The little coiled springs 112 keep these fingers down under normal conditions. These fingers 109 and the projections 108 act together so as to clamp the cork strip when the head 106 is in its position just below the cork strip and the fingers 109 in their lowermost position. These fingers 109 are raised and lowered when the guides 110 are raised and lowered, and this is accomplished by means of the cam 97 which engages a roller 113 attached to an upright 114 which is integral with the guide 110, and also fixed on a lever 115 which is pivoted at the pivot 102 next the lever 101 and is held down by means of a spring 116 which is secured at its upper end to the pin 117 on the lever 115 and at its lower end to the screw or pin 105. The uprights 100 and 114 are preferably guided by brackets 118 and 119 respectively, in which they slide and are held in proper position. These brackets are mounted on the plate 94.

The lever 115 is rocked by the cam 97 which engages a roller 120 mounted in said lever, and this cam roller 120 is held against the cam 97 by the action of the spring 116, which has been described above.

The cam 98 engages a cam roller 121 mounted on a lever 122, which is pivoted at its lower end to a bracket 123 secured to the frame 9 and which does not partake of the movement of the slide 94. The upper end of the lever 122 is suitably slotted so as to form a guide for a slide 124 which is pivotally mounted on a pin 125 fixed to the slide 94, so that the swinging of the lever 122 under the influence of the cam 98 and cam roller 121 will cause the slide 94 and all that it contains or carries to reciprocate in the same direction, and in the reverse direction of the feed of the cigarette rod 107. When moving in the direction of the cigarette rod it moves at the same speed, or practically the same speed, because of the peculiar shape of the cam 98, which is so made for this purpose.

The slide 94 also carries suitable guides for the cigarette rod 107. When first passing over the slide 94 the rod enters a die or guide 126 supported on a bracket 127 which is carried by the slide 94 and is secured thereto. A horizontally disposed arm 128 is secured to the top of the bracket 127 and runs in the direction of the line of movement of the rod 107 to a point well over the part 106 where the depending guide 129 is secured in place by the bolts 130, or any other suitable means. The function of this guide 129 is to keep the rod 107 from being flexed when the head 106 is elevated so as to force the cork band against the rod 107 where it is held. The slide 94 also carries a trough 131 which is inclined and converged so as to force the ends of the cork strip 17 into a vertical position. After the rod with the cork tips leaves the trough 131 it is ready for the end folding mechanism which will be described below.

The operation of the band applying mechanism is as follows:

Assuming the strips of cork to be as shown in Fig. 12, the jaws 40 and 60 are then (after the jaws 40 are elevated) withdrawn to the position shown in Fig. 10. The cams 96, 97, and 98 are so made that the movements of fingers 109 and head 106 are as follows: Starting with the position shown in Fig. 12, the slide 94 is stationary and the fingers 109 and head 106 hold the end of the cork strip 17. In this stationary position of 109 and 106, the cork supplying mechanism recedes back of the shearing mechanism and immediately the projecting end of the cork strip held by 109 and 106 is severed. As soon as the strip is severed the slide 94 with all its attached parts starts to travel in the direction of movement of the cigarette rod. Simultaneously with the start of travel of slide 94, the head 106 and fingers 109 still holding the cork, start to rise. The parallel rise of 109 and 106 continues till the strip of cork is level or approximately level with the bottom of the cigarette rod 107. Having reached this position, the fingers 109 start a more rapid rise than the head 106, thereby releasing their grip on the cork strip and allowing it to be forced against the cigarette rod 107 and pasted to substantially the lower half of the cigarette rod by the peculiar shape of head 106 which fits this rod. The slide 94, all this time, has been traveling in the direction of the travel of cigarette rod and at the same speed as the rod. When the strip of cork has been firmly secured to the bottom half of the cigarette rod, the fingers 109 and head 106 are in position shown in Fig. 10 and the slide 94 is almost at the end of its stroke. During remainder of the travel of slide 94 in the direction of the travel of the cigarette rod the head 106 drops to its original position shown in Fig. 12, but the fingers 109 remain at the elevation shown in Fig. 10. This position of 106 and 109 is retained during the return stroke of slide 94 to its resting position, and in the resting position until the cork supplying mechanism has extended the cork strip to the position to be held before the return of the cork supplying mechanism. At this point the fingers 109 descend and grip the projecting end of the cork strip as shown in Fig. 12. This cycle of operation is repeated when the machine is in use.

*The end securing mechanism.*

The end securing mechanism 13 is carried by the slide 94, except that there are three cams supported on the bed 9 of the machine, so that these cams operating on pintles or rollers, carried by the end securing mechanism, will operate so as to secure the ends in a manner which will now be observed.

The frame 9 carries two brackets 133 and 134 respectively, the bracket 133 being in front of the slide 94, and secured by bolts or other suitable means, and the bracket 134 is in the rear of the slide 94, and is also secured by means of bolts. These brackets carry pivoted cams which form a part of the end securing mechanism which will now be described in detail. The bracket 133 has an inclined upper surface which has a pivoted cam 135 mounted thereon, and the bracket 134 has two vertically disposed surfaces each of which carries a pivoted cam, one being numbered 136 and the other 137. These three cams, 135, 136, and 137 are each provided with a retracting spring 138, 139 and 140 respectively, and each cam has a pivot 141, 142 and 143. Each of these cams has a beveled edge 144 and a straight edge 145 which runs at angle to the beveled edge 144, and a stop-pin 146, so that when the cam is struck by a pintle going in one direction, the pintle is raised, and when the cam is struck by the same pintle going in the reverse direction, the cam is thrown out of the way of the pintle and does not raise the same. The cams are placed so as to act successively in the direction of the travel of the cigarette rod which may be termed the forward movement of the slide 94, the cam 136 acting first and this is followed by the cams 135 and 137.

The slide 94 carries two pairs of brackets 147 and 148 respectively. The bracket 147 carries a single shaft 149, the bracket 148 carries two shafts 150 and 151. The shaft 149 has fixed thereto a sleeve 152 from which extends a lug 153 which carries a pintle or roller 154 in the conventional manner. The shaft 150 carries a similar sleeve 155 provided with a similar lug 156 which carries a similar pintle 157, and the shaft 151 also has a sleeve 158 provided with a projection 159 which carries a pintle roller 160. The roller 154 is adapted to engage with and coöperate with the pivoted cam 135, and similarly, the roller 157 engages the cam 136 and the roller 160 the cam 137. The shafts 149, 150 and 151, at each side of their respective sleeves, 152, 155 and 158 carry arms 161, 162 and 163 respectively which arms are united at their free ends by folders 164, 165 and 166 respectively. Each of these folders comes down successively on an end of the cork strip 17 so as to cause the same to adhere to the rod 107, in a manner which will be described below. Each of the sleeves 152, 155 and 158 respectively, carries an anchor plate 167, which is held in place by means of a screw 168. Each of these anchor plate 167 engages two spiral springs 169 and 170 respectively. One of these springs, say the spring 169, rests on a part of the bracket or other part movable with the slide 94, and the free end of the other spring, say the spring 170, against a projection or arm 161, Under normal conditions, the respective folders are out of contact with the cigarette rod, and only in contact therewith with a spring pressure when acted upon by the cams, as hereinafter set forth. By referring to Figs. 14 and 18 it will be seen that there is more than a spring connection between the sleeves on the respective shafts and the arms adjacent thereto, as these shafts each have a pin 171 entering a corresponding recess 172 in the arm, so that while the pin 171 engages the wall in rear of the slot or opening 172, the sleeves will not hold the arms positively on the movement toward the cigarette. This permits an elevation of the folders for any irregularities in the cigarette rod 107 and makes the folders self adjusting for all rods of differing cross-section that may pass through the machine. The rod 107 runs on a guide 173 secured to the slide 94 by screws, or in any other suitable manner. This guide and the folders 164 and 165 are preferably shaped so as to conform to the cross-section of the cigarette rod 107 on which the cork tip is placed.

To prevent the arms 161, 162 and 163 from sliding too far back when in an inoperative position, it is preferable to provide stops. This is done, as shown in Fig. 13, by placing rigid stops 174 and 175 on the slide 94 adjacent to the guide 173, and a link or stop 176 which connects the arm 163 with the bracket 148, the link 176 being slotted at its lower end and having engagement with the screw in the arm or bracket 148 so that under no circumstances will this stop 176 in any way interfere with the operation of the arm 163 when causing the folder 166 to close a seam.

The pivoted cams 135, 136 and 137 are so placed as to act successively, the cam 135 acting first and the cam 137 acting last. They are so placed and arranged as to act only when the slide 94 moves in the direction of movement of the cigarette rod 107, and they never act on the return movement of the slide, that is the movement in the opposite direction from the direction of movement of the rod 107.

After the cork strip 17 leaves the trough 131 it enters the end attaching mechanism with its ends extending upwardly as shown in Fig. 13, and its middle portion secured to the under side of the cigarette rod. By the nature of the mechanism above described, the folder 164, is thrown forward as indicated by the dotted line in Fig. 13, and this forces down the end nearest to it against the cigarette rod 107 and immediately retreats, and soon thereafter the folder 165 acts on the other end of the band 17 and secures it to the rod 107 and the secured end of the band. Immediately after the folder 165 retreats, the folder or clamp 166 falls and secures both ends together and in place, and remains thereon long enough to make the joint or connection permanent, and then retreats.

As has been described, the band applying mechanism, the severing mechanism and the end securing mechanism are secured to the slide 94 and partake of its motion in such relation that the ends are secured on the strip which has been applied at the immediately preceding cycle of the machine. Thus, while the slide 94 with its attachments returns after a strip has been applied, the travel of the cigarette rod, carries the portion with its applied tip just so far as to be in position for the end securing mechanism when the slide starts on its forward stroke to apply the succeeding band. Since the band of cork is for two cigarettes, as has been described at the beginning of the specification, the distance between the band applying mechanism and end securing mechanism must be twice the length of a cigarette. To accommodate longer cigarettes without change in the machine, the folders 164 165, and 166, are made longer than a band of cork (Fig. 18). For instance, if a cigarette is made ½″ longer, the distance between band applying and end securing would be 1 inch greater, but the length of the folders is such that they would still act properly on the band, although the band would have a position near the other end of the folders from that shown in Fig. 18. The cigarette rod 107, with its band permanently and perfectly secured then passes on to the severing mechanism, which will now be described.

*The severing mechanism.*

The severing wheel 177 is mounted on a bracket 178 and runs thereon in the usual manner. It is driven by a belt 179, supplied with power from any suitable source, as a second belt 180, driven from any suitable part of the cigarette machine. The bracket 178 is pivoted on the shaft 181 which is mounted on a bracket 182. The bracket 178 is rocked on pivot 181 by means of a rod 183, with a ball end which enters a socket 184 of this bracket 178. The rod 183 is actuated by any suitable mechanism so as to reciprocate at periodical intervals and thereby cause the cutter 177 to be lowered and sever the cigarette rod at regular intervals, so that the cutter descending divides the rod midway between the edges of the cork, and also midway between the cork bands, as indicated in Fig. 22. It is obvious that by changing the gears so as to vary the number of operations of the bracket 178 in a given time, and by keeping the feed of the rod uniform, it may be severed into any desired length according to the length of cigarette it is desired to make. The tipping device is geared to this same shaft and so the relation of cutting and tipping is always 2 to 1. In other words, one strip of mouthpiece material will always be secured to the rod while the knife cuts twice. The bracket 182 rises from a slide 185 mounted on the frame of the machine so that when the cutter 177 is severing the cigarette rod it will move directly with and in the direction of the cigarette rod. Suitable mechanism is provided for causing this movement of the bracket 182 on its slide. While the cigarette rod 107 is being severed, it is passing through guides 186 and 187 carried by a bracket 188 mounted on the frame 182.

*Cigarette assembling mechanism.*

From the guiding tube 187 the severed rod, or more properly speaking, the cigarettes, pass to the assembling mechanism. This assembling mechanism is necessary as some of the cigarettes have their cork ends in the front and some at the rear, as they pass through the tube 187. It is necessary to assemble those standing in one way at one place, and those standing in another way at another place, so that when the attendant gathers the cigarettes, he will gather them so that all in the same group will stand alike. This is accomplished by the mechanism to be described. From the guide 187 the rod 107 enters the split tube 189 which is provided with a hinge 190, and also, at one end, with pintles 191 which are mounted to roll on a cam surface 192, on a lever 193, pivoted at 194 to the frame 215 of the machine. This frame is secured to the machine by bolts 216, acting through slotted holes 217 so the whole dropping mechanism can be moved in the direction of the length of the cigarette rod for adjusting according to the size of cigarette being made on the machine.

Except when the pintles are acted upon, as described below, the tube 189 remains closed, and does not open, this condition being caused by the action of the spring 195. The hinge 190 includes a shaft 196 mounted in brackets 197 carried by the frame 215 in any suitable manner. The lever 193 is provided with a pintle 198 carried in a bearing 199 fixed to the lever and this lever is kept normally down by means of a coiled spring 200, attached in the conventional manner, or by any other suitable means. The pintle 198 is adapted to run on a cam 201 fixed to a sprocket wheel 202, and mounted on an axle 203. The sprocket wheel 202 is driven by means of a sprocket chain 204 which is driven from the main shaft of the machine in any suitable way, and is kept tight by means of a slack adjuster 205 of the conventional kind. This slack adjuster is mounted on the frame 8 of the machine. The parts are so designed and disposed that the cutter 177 will descend twice upon the rod 107 for each opening of the tube 189 and this tube opens once for each revolution of the cam 201.

Connected to the cam 201, is a pulley 206 which carries a belt 207, that runs to a second pulley 208, mounted in bearings which come from a bracket 209 fixed to the bed 8 of the machine. The shaft 210 on which the pulley 208 is mounted, also carries a roller 211 on which runs an endless belt 212 which goes over a second pulley, not shown, and mounted in any suitable support. On each side of the belt 212 is placed a guide 213, and over the belt at the end of its run nearest the machine and also over the pulley 211, is placed an incline 214 down which the cigarettes slide or roll upon the belt after being dropped from the tube 189. The pulley 208 is driven at any suitable speed by the belt 207, mounted as above described.

If desired, a stop 218, may be placed on the frame 8 so as to limit the downward movement of the lever 193. The guides 213 are supported from the brackets 209, or from any other suitable support.

*Operation.*

In view of the foregoing, the operation of my improved machine will be readily understood. Assuming that the cigarette rod 107 passes continuously through the machine, in the conventional manner, cork tips may or may not be applied at the discretion of the operator. If he desires to have the cork tips applied, and has the cork and paste in proper condition, and the machine ready for action, that is in the condition described above, he simply throws the lever 65 so as to throw the clutch 64 into action. The machine is then driven so as to apply the bands. They are fed by the band feeding mechanism 10, severed by the band severing mechanism 11, and then applied to the under side of the rod by the mechanism 12. As the movement continues the ends are secured by the mechanism 13 and then the rod goes to the severing mechanism, and there it is severed by the cutter 177, and thence to the distributing mechanism where the cigarettes are dropped in pairs on the receiving belt 212, and from thence are passed to any suitable place for assembling and distribution in the various packing boxes for which they are made.

While I have shown and described an embodiment of my invention, it is obvious that it is not restricted thereto, but that it is broad enough to cover all structures which come within the scope of the annexed claims.

What I claim is.

1. In a machine of the class described, means for feeding a ribbon to a cigarette rod, means for severing the ribbon of tipping material adjacent to said rod, means for pressing the severed portion of the ribbon against the lower portion of the rod, and suitable movable means movable with and at substantially the speed of the rod for folding down the ends of the strips upon the cigarette rod.

2. In a machine of the class described, means for feeding a freshly pasted ribbon of tipping material to a cigarette rod, means for severing the rod, means for severing the tipping material strips, means for applying the severed portion of the tipping strip to the under side of the cigarette rod, and pivoted means movable with and at substantially the speed of the rod for folding down the ends of the band on the cigarette rod, whereby a band is properly and firmly placed at regular intervals on said rod.

3. In a machine of the class described, a frame carrying fixed and movable portions, means on said fixed portion for carrying a ribbon of tipping material, means for feeding a ribbon of tipping material, means for supplying paste to its ribbon and means for severing this ribbon, means on said movable portion for receiving the cigarette rod and guiding the same, means for receiving the severed portion of the ribbon of tipping material and forcing the same against the under side of the rod, means for preventing the flexure of the rod at the point where the tipping strip is applied, means for maintaining the ends of the tipping strip in a vertical position, and movable means on said movable portion for folding down the ends of the said strip on said rod.

4. In a machine of the class described, means for feeding a tipping ribbon, means for severing the tipping ribbon, means for feeding a cigarette rod, means for placing the severed portion of the ribbon underneath the rod and attaching the same thereto, means for forcing the free ends of the band against the cigarette rod, means for severing the cigarette rod between the ends of the tipping band, and also through tipping band, a split tube adapted to receive the severed ends of the cigarette rod, means for mounting said tube and means for opening said tube substantially parallel to its axis so that the cigarettes therein may be deposited in a uniform manner and those in a given group will stand the same way.

5. In a machine of the class described, a paste reservoir, and means for supporting the same, means for regulating the outflow of paste from said reservoir, a roller mounted so as to revolve continuously under said reservoir, and means for mounting said roller, a second roller mounted under the first roller, means for mounting a strip, means for feeding this strip, means for forcing the second roller against a strip on the under surface of the first mentioned roller with a resilient pressure, and means for driving one of said rollers at a less speed than the feed of said strip.

6. In a machine of the class described, means for moving a ribbon of tipping material intermittently for a predetermined distance, paste rollers and means for mounting the same, means for driving one of said paste rollers so that the said rollers will feed the ribbon a less amount than the said feeding mechanism acting intermittently will feed the ribbon so that the accumulation of slack is prevented.

7. In a machine of the class described, a frame and a slide mounted thereon, a fixed blade mounted on said slide, bearings on said slide, a shaft carried by said bearings, a blade fixed to said shaft and a spring for holding said blades in proper relation one to the other.

8. In a machine of the class described, a frame and a slide mounted thereon adapted to reciprocate forward and back, a fixed jaw and a pivoted jaw mounted on said slide and a cam for raising the pivoted jaw on the return movement of the slide and a spring for depressing said jaw under normal conditions.

9. In a machine of the class described, a slide adapted to move forward and back, a fixed jaw and a movable jaw pivoted to the slide, a cam for raising the jaw on the return movement of the slide, means for reciprocating the slide, and means for adjusting the throw of the slide so that different lengths of movement may be had at the volition of the operator.

10. In a machine of the class described, ribbon feeding mechanism adapted to feed a tipping ribbon at periodical intervals and grip the ribbon near each edge, means for severing said ribbon at the end of its feed, and means for gripping said ribbon adjacent to the other gripping mechanism prior to the severing.

11. In a machine of the class described, a slide and means for mounting the same, means for driving the same in a reciprocating manner, a jaw fixed to said slide, a jaw pivotally connected to said slide, parallel grippers secured to said jaw and adapted to engage a tipping strip or ribbon, means for severing said strip at predetermined places, and means for engaging one end of said ribbon prior to severing the same and while the jaws or grippers are retreating.

12. In a machine of the class described, grippers adapted to feed a tipping ribbon, and means for mounting the same, said means including a slide and means for mounting said slide, a second slide mounted in the first slide and a bolt secured therein, a lever with an adjustable connection with said bolt and means for pivoting the lower end of said lever, a cam and a pintle on said lever adapted to engage said cam whereby said slides are reciprocated.

13. In a machine of the class described, a frame, a guard mounted on said frame, grippers adapted to hold and feed a tipping ribbon, and means for actuating said grippers, two of said grippers being placed so as to rest on said guard so that the tipping ribbon may be held true while being severed.

14. In a machine of the class described, a shaft having two cams thereon, one of said cams being a slide actuating cam and the other a gripper actuating cam, a frame in which said shaft is journaled, a slide and connections between one of said cams and said slide whereby said slide is reciprocated when said cam rotates, a gripper fixed to said slide and a gripper pivotally connected to said slide, means connecting the pivoted gripper with the other cam so that at times said gripper is raised on its return movement under the action of said last mentioned cam.

15. In a machine of the class described, a frame, a plate adjustably mounted on said frame, a shearing blade fixedly connected to said plate, bearings supported by said plate, a shaft mounted in said bearings, means for oscillating said shaft, a blade fixed to said shaft adapted to coöperate with said other blade so as to act with said blade as a shear for severing tipping ribbon.

16. In a machine of the class described, a frame, a plate mounted on said frame, a blade fixedly mounted on said plate, bearings mounted on said plate, a shaft journaled in said bearings and means for operating said shaft, a blade mounted on said shaft and a spring between said blade and one of said bearings whereby the fixed blade and the other blade are kept in proper relation, one with another for shearing the cork ribbon.

17. In a machine of the class described, a frame with a shaft journaled therein, a cam mounted on said shaft, a cam roller engaging said cam, a lever on which said roller is mounted and means for pivoting said lever, an arm adapted to engage the upper end of said lever and means for causing said arm to remain in engagement with said lever, a shaft to which said arm is secured and means for journaling said shaft, a blade mounted on said shaft, and a second blade fixedly secured with regard to said shaft, and means for holding said blades in proper relation one with regard to the other so that cork may be severed when said cam is shifted to a suitable position.

18. In a machine of the class described, a frame, a slide and means for mounting the slide so that it can reciprocate on said frame, a guide, a head and means for mounting said head so that it can rise and fall under said guide, spring fingers and means for mounting the same so that they may engage parts of said head and means for reciprocating said fingers so that they will move to and away from said head.

19. In a machine of the class described, a frame and means for mounting a slide on said frame, so that the slide may reciprocate, a head mounted so as to be raised and lowered on said slide, fingers and means for mounting the same over said head, so that said fingers are adapted to engage said head, and means for raising and lowering said fingers, so that when the device is in use a strip of cork ribbon may be fed between the head and fingers and later clamped thereby.

20. In a machine of the class described, a frame and a shaft mounted in said frame, a slide and means for mounting the same on said frame, a series of cams on said shaft, one of which is adapted to drive said slide, mechanism connecting said slide and said first mentioned cam, a head and means for connecting the same with said second cam, and fingers and means for connecting the same to the third cam, whereby when the device is in use, the rotation of the shaft will reciprocate the slide and raise and lower the head and fingers.

21. In a machine of the class described, a frame, a slide and means for causing said slide to reciprocate on said frame, folders mounted on said slide and movable cams mounted on said frame, and means connecting said folders and cams whereby said folders will be successively operated upon by said cam when the slide moves in one direction, and will not be shifted by the cam when the slide moves in the other direction.

22. In a machine of the class described, a frame, a slide and means for mounting said slide on said frame so that the slide will reciprocate, pivoted folders and mechanism on said slide in which said folders are mounted, pintles and means connecting said pintles and folders, brackets on said frame and cams mounted on said brackets which are adapted to be engaged by said pintles when the slide moves in one direction so as to elevate the pintle and to engage said cam so as not to raise the pintle when the slide moves in the other direction.

23. In a machine of the class described, a frame, folders mounted on said frame, pintles connected with said folders, and adapted to shift the same, means for limiting the return movement of said folders, brackets on said frame and cams pivotally mounted on said brackets and adapted to engage said pintles so as to raise said pintles when the slide moves in one direction and not to raise said pintles when the slide moves in the other direction.

24. In a machine of the class described, a frame, a slide and means for mounting said slide on said frame so that the slide may reciprocate, cams mounted on said frame, folders mounted on said slide, and resilient connections between said cams and folders, so that the folders may be raised from a cigarette rod passing underneath the same should such raising be necessary and will automatically adjust themselves to different sizes of cigarette rods.

25. In a machine of the class described, a folder and means for supporting the same, said means comprising a pair of arms, a pivot and means for supporting the pivot, a sleeve mounted on said pivot and between said arms, a coiled spring surrounding said sleeve and connected thereto so as to cause the same to be placed in one position, the other end of said spring being connected with said support, a second spring connecting said sleeve with one of said arms, and a pin in said pivot entering a suitable recess in said arm.

26. In a machine of the class described, a split tube and a hinge for the same, a spring for holding the parts of said tubes together, means for supporting said hinge, and means for separating said parts of said tubes so that the contents of said tube may be dropped.

27. In a machine of the class described, a split tube, a hinge for said tube, a spring to hold the parts of said tube together, except when said parts are positively separated, means for supporting said hinge, pintles secured to the parts of said tube and a cam adapted to rise against said pintles and open said tube whereby the contents of the same may be dropped.

28. In a machine of the class described, a split tube, a hinge connected thereto and a spring for holding said tube closed, pintles at one end of said tube and a cam adapted to engage said pintles, means for raising and lowering said cam and means for receiving the contents of said tube when the same is open.

29. In a machine of the class described, a split tube and means for supporting same, means for keeping said tube normally closed, means for opening said tube at periodical intervals whereby its contents may be dropped, an incline and means for supporting the same so that it is adapted to receive said contents, a belt and means for driving said belt beneath said incline.

30. In a machine of the class described, a split tube and means for supporting the same, means for keeping said tube normally closed, means for opening said tube at periodical intervals, means for receiving the contents of said tube when the same is opened and a belt beneath said means for receiving the contents of said tube from said means, and mechanism for supporting said belt.

31. In a machine of the class described, a plate, a shearing mechanism on said plate comprising a shearing blade fixedly mounted, bearings supported by said plate, a shaft mounted in said bearings, a spring for moving said shaft in one direction, means for oscillating said shaft in the other direction, a blade fixed to said shaft adapted to coöperate with said other blade so as to act with said blade as a shear for severing a ribbon, said spring being so located and connected as to cause the shearing operation of the blades.

32. In a machine of the class described, means for driving a cigarette rod through the machine, means for securing a strip of tipping material to the lower surface of this rod as it passes through this machine, and mechanism moving in the same direction as the rod and also against the rod to secure the ends of the tipping material.

Signed at the city, county and State of New York, this 15th day of May, 1913.

PAUL A. DRUCKLIEB.

Witnesses:
RAY BROCKMAN,
H. RADZINSKY.

Copies of this patent may be obtained for five cents each, by addressing the "Commissioner of Patents, Washington, D. C."